Patented Dec. 9, 1924.

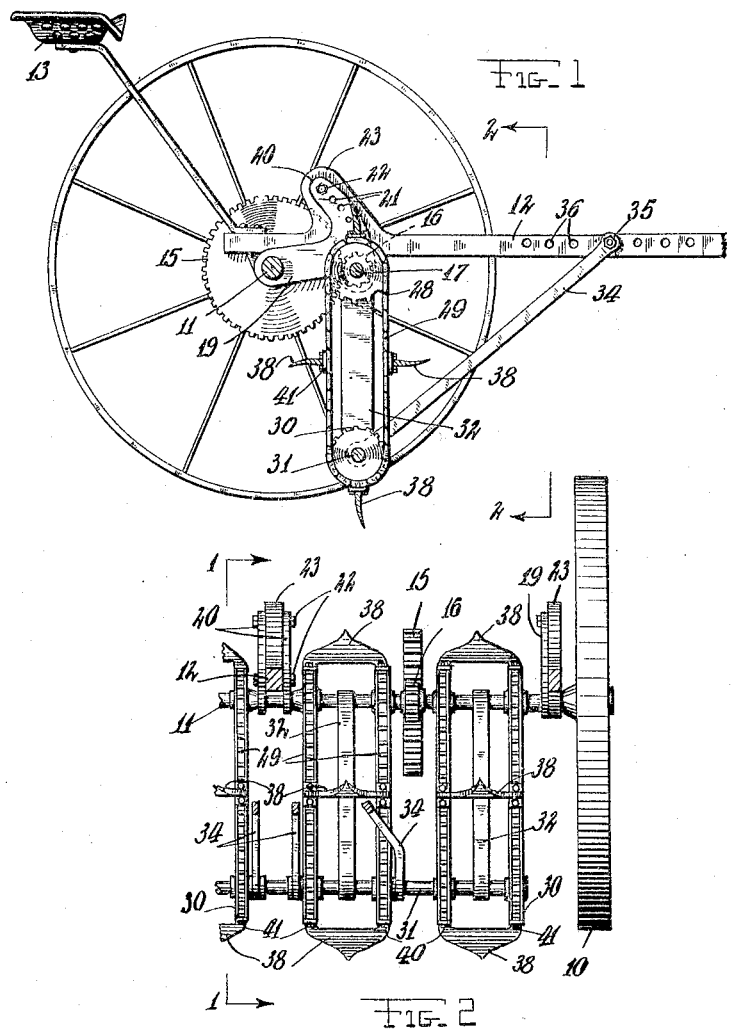

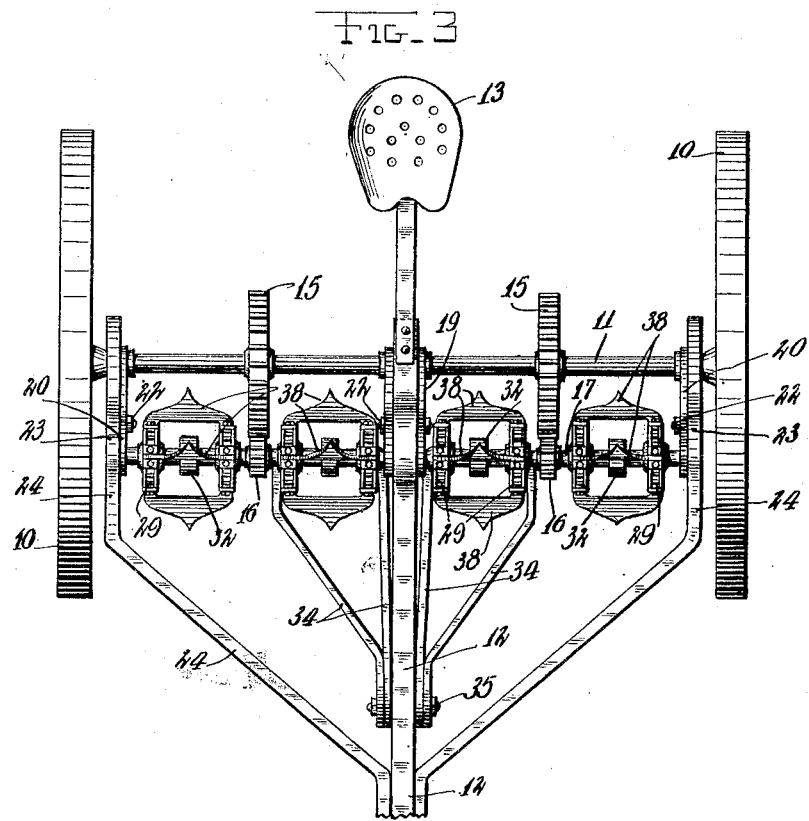
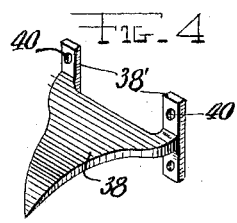
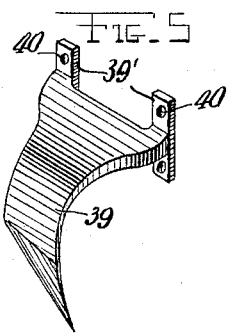

1,518,146

UNITED STATES PATENT OFFICE.

JUAN IBARRA, OF MARTINDALE, TEXAS.

AGRICULTURAL IMPLEMENT.

Application filed March 15, 1923. Serial No. 625,302.

*To all whom it may concern:*

Be it known that I, JUAN IBARRA, a citizen of the Republic of Mexico, residing at Martindale, in the county of Caldwell and State of Texas, have invented certain new and useful Improvements in Agricultural Implements, of which the following is a specification.

This invention relates to a machine for use in the cultivation of cotton fields, having for an object the provision of a novel machine of this type which may be utilized both for working the ground and severing the stalks.

For further comprehension of the invention, and of the objects and advantages thereof, reference will be had to the following description and accompanying drawings and to the appended claims in which the various novel features of the invention are more particularly set forth.

Fig. 1 of the drawings is a longitudinal sectional view of a machine constructed according to my invention.

Fig. 2 is a fragmentary transverse sectional view taken on the line 2—2 of Fig. 1.

Fig. 3 is a plan view.

Fig. 4 is a detail perspective view of one of the cultivator teeth.

Fig. 5 is a like view of one of the stalk cutting members.

My improved machine comprises a pair of wheels 10 mounted on an axle 11 to which one wheel may be fixed. Freely connected at its rear end to this axle is a tongue or beam 12 which may have a suitable draft device attached to its front end. The beam may support the usual driver's seat 13. Fixed on the axle 11 is a large spur gear 15 which meshes with a smaller gear 16 on a transverse shaft 17 adapted for bodily adjustment in a generally vertical direction, around the axle 11 concentric to the latter.

As here shown the shaft 17 is journaled in the forward ends of a number of arms 19 freely mounted at their rear ends on the axle. These arms have arcuate extensions 20 in which are rows of holes such as 21 arranged concentric to the axle and adapted to selectively receive fastening bolts 22 which pass through suitable apertures in fin-like projections 23 from the top face of the beam and from side bracing elements 24 which engage over the shaft at their rear ends and are inclined toward one another at their forward ends and rigidly secured to the beam 12, whereby the respective arms may be clamped to the beam and to the members 24 in such positions as may be desired.

Fixed to the shaft 17, and suitably spaced therealong, are pairs of sprocket wheels 28 over which are looped the sprocket chains 29 which extend downward and are looped also over other pairs of sprocket wheels 30 on a lower transverse shaft 31 journaled in the lower ends of arms 32 depending freely from the shaft 17. Engaged freely with the shaft 31 are the rear ends of rigid bars 34 which project forwardly and upwardly and are adapted to be adjustably attached to the beam 12 at their forward ends by means of a bolt 35 passing through said forward ends and through any one of the number of apertures spaced along said beam.

Each pair of chains 29 is adapted to have secured thereto either the cultivating or stalk cutting members, the former comprising the curved and pointed members 38, while the latter comprise the blades 39. These members have formed integral therewith the short parallel bars 38' and 39' respectively which have holes 40 therein through which may be passed the screws 41 whereby they may be fastened to the chains.

When the machine is in use as a cultivator the chains extend in the vertical direction shown in Fig. 1, and it will be obvious that the distance that the cultivator teeth will dig into the ground may be varied by adjusting the shaft 17 vertically.

When the machine is in use as a stalk cutter the shaft 31 is swung forwardly so that the blades 39 as they advance upward over the front side of the lower sprocket wheels 30 will engage the stalks and sever the latter.

While I have illustrated and described a preferred embodiment of my invention it is to be understood that I do not limit myself to the precise construction herein disclosed, and the right is reserved to all changes and modifications coming within the spirit and scope of the appended claims.

Having thus described my invention what I claim as new and desire to protect by Letters Patent of the United States is as follows:

1. A machine of the type described comprising wheels, a rotary axle on which said wheels are mounted, a frame connected to said axle, a series of arms engaged freely at their rear ends with said axle, a shaft supported in the front ends of said arms, pairs of sprocket wheels fixed on said shaft, bars depending freely from said shaft, a second shaft mounted in the lower ends of said bars, pairs of sprocket wheels on said second shaft, pairs of sprocket chains looped over said sprocket wheels, cultivator teeth carried by said chains, arcuate extensions formed on said arms and provided with spaced apertures, bolts passing through selected ones of said apertures and engaged with the said frame for securing the said arms to the frame in vertically adjusted positions, and adjustable means applied to the said second shaft to brace it against swinging movement.

2. A machine of the type described comprising wheels, a rotary axle on which said wheels are mounted, a frame connected to said axle, a series of arms engaged freely at their rear ends with said axle, a shaft supported in the front ends of said arms, pairs of sprocket wheels fixed on said shaft, bars depending freely from said shaft, a second shaft mounted in the lower ends of said bars, pairs of sprocket wheels on said second shaft, pairs of sprocket chains looped over said sprocket wheels, cultivator teeth carried by said chains, arcuate extensions formed on said arms and provided with spaced apertures, and bolts passing through selected ones of said apertures and engaged with the said frame for securing said arms to the frame in vertically adjusted positions, and adjustable means applied to the said second shaft to brace it against swinging movement, said means comprising bars engaged freely with the said second shaft at their rear ends, and a bolt passing through the forward ends of the bars and through a selected one of a series of apertures in said frame.

3. A machine of the type described comprising wheels, a rotary axle on which said wheels are mounted, a beam connected to said axle, a series of arms engaged freely at their rear ends with said axle, a shaft supported in the front ends of said arms, pairs of sprocket wheels fixed on said shaft, a second shaft supported by and underneath the first shaft, pairs of sprocket wheels on said second shaft, pairs of sprocket chains looped over the said sprocket wheels, and cultivator teeth carried by said chains, and means for securing the said arms to the said beam in vertically adjusted positions, and a series of bars engaged freely with the said second shaft at their rear ends and being adapted for connection to said beam at their forward ends at different points along the latter.

In testimony whereof I have affixed my signature.

JUAN IBARRA.